United States Patent [19]
Linde

[11] 3,856,394
[45] Dec. 24, 1974

[54] FILM HOLDING ARRANGEMENT FOR PHOTOSETTING MACHINE

[75] Inventor: Hans Linde, Berlin, Germany

[73] Assignee: Firma H. Berthold AG, Berlin, Germany

[22] Filed: Sept. 10, 1973

[21] Appl. No.: 396,050

[30]    Foreign Application Priority Data
Oct. 5, 1972   Germany............................ 2249197

[52] U.S. Cl......................... 354/275, 354/5, 355/72
[51] Int. Cl........................................... B41b 21/32
[58] Field of Search................ 95/37, 31 CA, 4.5 R; 352/78 R, 78 C, 72; 242/71.1, 71.7

[56]        References Cited
            UNITED STATES PATENTS
2,980,000   4/1961   Kopp et al........................ 352/72 X

*Primary Examiner*—Robert P. Greiner
*Attorney, Agent, or Firm*—Karl F. Ross; Herbert Dubno

[57]         ABSTRACT

A photosetting machine has a traverse formed with a support defining a seat and with a throughgoing exposure slot under said seat. A cassette has a cylindrical shell in which a cylindrical drum is journaled on a shaft. A piece of film is wrapped circumferentially around the drum and has its ends secured thereto by a pair of blocking elements each extending axially on the drum. A torsion spring is connected between the shell and the shaft of the drum to urge this drum into a position with one of the blocking elements resting against a bumper in the shell while preventing light entering the exposure window in the shell from falling on the film. An arm outside the shell is mounted on the shaft of the drum and has a gudgeon engageable with a cam slot on the support so as to pivot this drum on fitting of the cassette onto the seat and to allow light to fall on the film. This cam slot is formed on a gear wheel that also serves to rotate the drum within the shell.

10 Claims, 3 Drawing Figures

FILM HOLDING ARRANGEMENT FOR PHOTOSETTING MACHINE

FIELD OF THE INVENTION

The present invention relates to a film holding arrangement for a photosetting machine. More particularly this invention concerns a film cassette for a photosetting machine and the holder for the cassette in this machine.

BACKGROUND OF THE INVENTION

A conventional film cassette comprises a bobbin carrying a length of film whose one end is attached to the bobbin and whose other end projects through a radially open and longitudinally extending slot in a can or container surrounding this bobbin. The ends of the bobbin extend through lighttight joints from the cylindrically shaped can to allow the film to be wound back into the cassette after exposure, and the slot is provided with a pair of felt lips between which the film passes so as to prevent light leakage into the cassette.

In photosetting or photocomposition machines such as are described in the commonly assigned U.S. Pat. Nos. 3,507,576, 3,522,827, and 3,640,143 respectively issued on 21 Apr. 1970, 2 Jan. 1972, and 8 Feb. 1972, the film remains in the cassette. More specifically the film is wrapped around a cylindrical drum itself received within a cylindrical can having a longitudinally extending and radially directed opening. The drum is rotated stepwise and is exposed line-by-line to an image thrown on the film through the slot.

Such a cassette is relatively long and is usually provided with a cover or other closure element for its exposure slot. Once the cassette is mounted in the photosetting machine this cover is removed. Clearly any premature removal of this cover will result in ruining the film. Similarly if it is not removed the film will not be exposed at all.

To this end various safety catches, interlocks, and the like have been provided to provide for the removal of the cover at the appropriate time. These devices at best are faulty, however, since the operator accustomed to loading the machine often bypasses them and frequently they do not work.

OBJECTS OF THE INVENTION

It is therefore an object of the present invention to provide an improved cassette loading system for a photosetter or the like.

Another object is the provision of an improved cassette and an improved holder-drive therefor.

Yet another object is to provide an inexpensive cassette which is not subject to premature opening or to exposure after use.

A further object is the provision of a film holding arrangement for a photosetting machine which overcomes the above-given disadvantages.

SUMMARY OF THE INVENTION

These objects are attained according to this invention in a system wherein the cassette is provided with a torsion spring that urges the film carrier into a predetermined end position. This carrier has a blocking element which is interposed between the film and the slot in this end position. Means is provided on the apparatus into which the cassette is fitted which automatically displaces this carrier out of its end position and reveals the film in the slot. Removal of the cassette causes the torsion spring to rotate the carrier back into the position wherein the blocking element covers the exposure slot.

With such an arrangement no supplementary cover need be provided for the exposure slit. The cassette need merely be fitted into the photocomposition apparatus by the operator. This operation automatically uncovers the starting end of the film while removal automatically covers the film up again.

In accordance with the present invention the film carrier is a cylindrical drum having a central rotation axis and received within a similarly cylindrical can. A strip of film is wound circumferentially around the drum, the film ends being secured under longitudinally extending elastomeric strips which rub the inside of the can. The can is formed with a longitudinally elongated exposure slot formed itself between a pair of radially projecting lips. Adjacent one of the lips there is provided a bumper engageable with the end strips securing the film ends to the drum. The torsion spring is of the spiral type with one end attached to the can and another end attached to the pivot and prestressed to urge the drum into a position with one of the sealing strips lying against the bumper and the slot opening under or between the two strips where there is no exposable film.

This means for automatically displacing the drum into a position where the film can be exposed through the exposure slit comprises, according to the present invention, a radially extending arm secured at one end to the pivot axle of the drum outside of the can and engageable with a cam on positioning of the cassette to the photocomposition machine so as to pivot the arm through an angular distance to pivot this drum against the force of its spring.

DESCRIPTION OF THE DRAWING

The above and other objects, features, and advantages of the invention will become more readily apparent from the following description, reference being made to the accompanying drawing in which.

SPECIFIC DESCRIPTION

Figure 1:
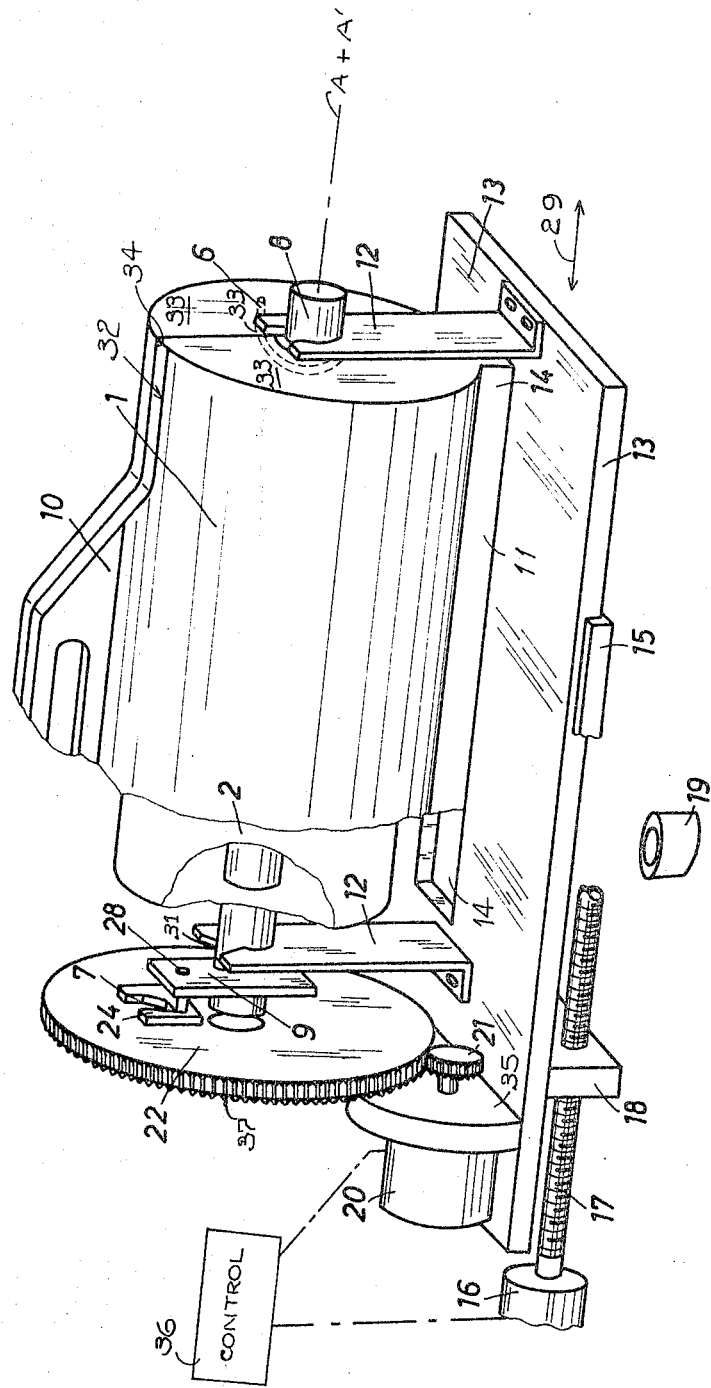
FIG. 1 is a perspective view, partly broken away, of the arrangement according to this invention.

As shown in FIG. 1 a photocomposition machine has a traverse plate 13 slidable in the direction of arrow 29 in a pair of guides 15 by means of a fixedly mounted motor 16 having a shaft 17 threaded into a nut 18 formed on the plate 13. This motor 16 can displace the entire traverse plate 13 back and forth above an objective 19 which projects information up through a slot 14 formed in the support plate 13 and of rectangular shape elongated in the direction 29.

Figure 3:
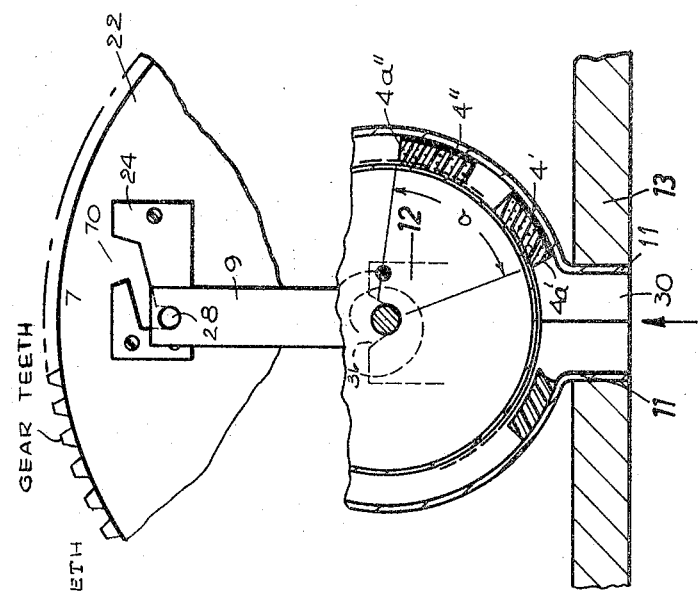
FIG. 3 is a view similar to that of FIG. 2 showing the completely mounted cassette.
Figure 2:
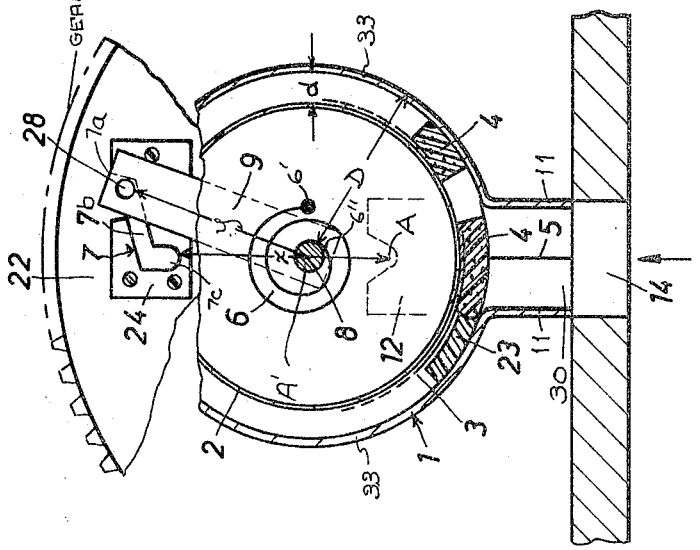
FIG. 2 is a cross section through the arrangement of FIG. 1 with the cassette only partially fitted into the photo-composition machine.

A pair of parallel support lugs 12 each located at one end of the hole 14 are each formed with an upwardly open seat 31 defining an axis A parallel to the direction 29 and to the hole 14. A pivot axle 8 of a cassette 1 lies in these seats 31 and has an axis A' centered on the axis A. This axle 8 carries a cylindrical drum 2 centered on the axis A' and having a diameter D. FIGS. 2 and 3 show how a piece of film 3 is wrapped circumferentially around the drum 2 with its ends secured under longitudinally extending sealing strips 4' and 4'' made of black foamed polyurethane. These strips 4' and 4'' have their outer edges 4a' and 4a'' spaced apart by an angular distance $a$ equal to, say, 60°, leaving the film 3 uncovered over 300°.

The drum 2 is journaled on its axle 8 in a metal or synthetic-resin cylindrical can 32 centered on the axis A and having a diameter D' which is greater than the diameter D by a distance $d$ which is slightly less than the radial height of the strips 4' and 4'' in their uncompressed state above the drum 2. This can 32 is formed of a pair of spectrally identical halves 33 joined along a seam 34 and together forming a handle 10 at the top of the can 32.

The can 32 is formed with a pair of radially and longitudinally extending parallel lips 11 which define a radially open slot 30 on the side of the can opposite the handle 30. This slot is the only opening in the otherwise closed can 32. The lips fit snugly within the rectangular slit 14. A polyamide bumper 23 is provided which is engageable with the edges 4a' and 4a'' of the sealing strips 4' and 4''. This bumper 23 is longitudinally elongated and located at the edge of the hole 30 within the can 32. A torsion spring 6 has one end 6' attached to the can 32 and another end 6'' attached to the axle 8. This spring 6 is prestressed so as to urge the edge 4a' against the bumper 23 in order that the film 3 not be exposed at the hole 30.

The axle 8 is provided at one end with a radially extending operating arm 9 formed with an axially projecting pin or gudgeon 28. The traverse 13 is provided with a flange 35 on which is mounted an electric motor 20 having a pinion 21 meshing with a large gear wheel 22 pivoted on the support 35 at the axis A. This motor 20 can rotage the gear 22 which has a shaft 37 engageable with the end of shaft 8 to rotate same. Offset from the axis A on the gear 22 is a cam body 24 formed with a cam slot 7 having one end 7a opening radially outwardly, a central offradial region 7b which when the end 7a opens upwardly itself lies at an angle to the horizontal, and an inner end 7c which when the end 7a opens upwardly lies directly above the axis A. The distance x from the end 7c to the axis A is equal to the distance y from the gudgeon 28 to the axis A'. The control system 36 for the photo-composition machine according to this invention is set so as to return the gear wheel 22 to the position shown with the end 7c of cam slot 7 lying directly above the axis A when the machine is to be loaded with a cassette 1.

To fit the cassette 1 to the traverse 13 its lips 11 are aligned with the hole 14 and the shaft 8 is pushed onto the seats 31. This action causes the pin 28 first to engage in the open mouth 7a of the slot 7 as shown in FIG. 2. Further downward displacement causes the pin 28 to slide along the region 7b, thereby rotating the drum 2 so that the edge 4a of the strip 4' pulls away from the bumper 23. As the ends of the axle 8 come to rest in the seats 31 the pin 28 also comes to rest in the closed end 7c of the slot 7. Simultaneously the lips 11 are fitted snugly completely into the hole 14 and the strip 4' is pivoted past the opening 30 to expose the portion of film 3 directly adjacent to its edge 4a'. Thereupon the motor 20 can rotate the entire drum 2 by turning the wheel 22 through the pinion 21, this wheel being angularly linked to the shaft 8 by the pin 28 on the arm 9. When the wheel 22 is returned to the position shown in FIGS. 2 and 3 after the film 3 is exposed, the cassette 1 is removed by lifting it upwardly. Such displacement cams the arm 9 back in the opposite direction, thereby allowing the strip 4 to move against the bumper 23 again. In this position, which is maintained by the torsion spring 6, the light entering the can 32 through the slot 30 cannot reach the area of film 3 between edges 4a' and 4a''.

With such an assembly the operator need not worry about removing a cover before placing the cassette in the machine, nor need he worry about properly covering the slit after removal of this cassette. The film is automatically protected from accidental exposure by an internal system that completely prevents light from entering the cassette unless that cassette is mounted in the photocomposition machine.

I claim:

1. A film holding arrangement for a photosetting machine or the like, said arrangement comprising:

a support;
   a shell on said support and formed with a window;
   a film-carrying drum received in and surrounded by said shell while being rotatable relative thereto;
   at least one blocking element attached to said drum over an end of a piece of film adapted to receive light through said window;
   spring means between said drum and said shell for urging said shell and drum into a relative position in which said element prevents light entering said shell through said window from falling on said film;

mounting means on said support including a seat for releasably supporting said shell; and
   means on said support and on said drum for relatively angularly displacing said shell and said drum to shift element out of said position when said shell is supported on said seat.

2. The arrangement defined in claim 1 wherein said shell and said drum are substantially cylindrical and coaxial, said drum being provided with an axially extending shaft journaled in said shell and engageable with said seat.

3. The arrangement defined in claim 2 wherein said means for relatively angularly displacing said shell and said drum includes an arm on said shaft and a cam on said support engageable with said arm.

4. The arrangement defined in claim 3 wherein said arm extends radially of said shaft and is provided with an axially extending gudgeon, said arrangement further comprising means on said support including a wheel for rotating said drum in said shell, said cam being provided on said wheel.

5. The arrangement defined in claim 4 wherein said cam is formed with a cam slot having one end open away from said seat and a region extending offradially to the axis of said drum with said shell in said seat, whereby displacement of said gudgeon along the offradial region of said slot pivots said arm about said axis.

6. The arrangement defined in claim 5 wherein said window is axially elongated and said shell is formed to either side of said window with an axially elongated lip, said lips being parallel, said support being formed with a slot snugly receiving said lips.

7. The arrangement defined in claim 2 wherein said spring means includes a torsion spring having one end anchored to said shell and another end connected to said shaft.

8. The arrangement defined in claim 2 wherein said piece of film is wrapped circumferentially around said drum and has each end anchored by a respective blocking element, said elements extending substantially axially on said drum and wiping the inside of said shell.

9. The arrangement defined in claim 1, further comprising a bumper in said shell engageable with said blocking element in said position thereof.

10. The arrangement defined in claim 1 wherein said support is a cross-member of a photosetting machine.

* * * * *